US006789824B1

(12) United States Patent
Delp

(10) Patent No.: US 6,789,824 B1
(45) Date of Patent: Sep. 14, 2004

(54) LAND VEHICLE TRACTION CONTROL DEVICE

(75) Inventor: Billy Ray Delp, 2800 N. Meridian Ave., Oklahoma City, OK (US) 73107-1041

(73) Assignee: Billy Ray Delp

( * ) Notice: Subject to any disclaimer, the term of this patent is extended or adjusted under 35 U.S.C. 154(b) by 39 days.

(21) Appl. No.: 10/638,207

(22) Filed: Aug. 11, 2003

(51) Int. Cl.[7] .............................................. B60B 39/00
(52) U.S. Cl. ............................ 291/20; 291/36; 291/23; 291/46
(58) Field of Search .............................. 291/19, 20, 23, 291/25, 28, 34, 36, 41, 46, 48

(56) References Cited

U.S. PATENT DOCUMENTS

| | | | | |
|---|---|---|---|---|
| 1,349,606 A | * | 8/1920 | Dandy | 291/28 |
| 1,879,747 A | * | 9/1932 | Hopkins | 291/28 |
| 2,487,157 A | * | 11/1949 | Mason | 291/19 |
| 2,623,766 A | * | 12/1952 | Ulric | 291/36 |

* cited by examiner

Primary Examiner—Mark T. Le

(57) ABSTRACT

A land vehicle traction control device consisting of a box containing sand, or other suitable anti-skid material, mounted near the wheels of a vehicle, a mechanism which controls the flow of sand to the wheels, and a nozzle that distributes material or sand to the wheels, said nozzle containing an ice pick and a heater element for discharging ice buildup. The control mechanism is activated by a selenoid which gets its power form the tail or stop lights and is controlled by switches located in the passenger compartment of the vehicle.

1 Claim, 7 Drawing Sheets

LAND VEHICLE TRACTION CONTROL DEVICE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

This invention relates to traction improvement of land motor vehicles on ice and snow.

2. Prior Art

All land vehicles, equipped with rubber tires, have a problem retaining traction under adverse ice and snow conditions.

The first application I encountered by a similar device was on a train locomotive with a large load. To get more traction upon startup, the device applied sand in front of the driving wheels of the locomotive. That was over 60 years ago. As a child I was quite impressed by that and in researching this device I have again encountered such a mechanism for locomotives.

There have been a number of patents issued for similar devices with different configurations. To the best of my knowledge none have had enough quality to be produced commercially. Being well versed on the makeup of motor vehicles and mechanics I do not see how some of them will operate. For instance, U.S. Pat. No. 4,852,949 to Quinn (1989) shows their device is in the engine compartment of the vehicles. Not only will this not fit in the engine compartment, but it will interfere with all equipment and wireing installed on or near the wheel well.

Also U.S. Pat. No. 6,012,746 to Girdwin (2000) shows the apparatus installed over or in front of the front seat of a vehicle. (1) The box has sharp corners which is a safety hazard, (2) It will cramp all passengers in the front seat and create another safety hazard in the operation of the vehicle, and (3) What are they going to use for a transmission when thay have to remove the original equipment? There is not room for both items to effectively operate in the space provided without interference.

Now I refer to U.S. Pat. Nos.(a) 1,501,650 to Dienstbach (1924), (b) 2,221,777 to Chapman (1940), (c) 2,625,417 to Sundheim (1953), (d) 2,672,361 to Werbe(1954), (e) 2,904,363 to Michaletz (1959), (f) 2,999,711 to Sturmer (1961), (g) 3,271,061 to Miller (1966), (h) 3,298,727 to Picard (1967), (i) 3,938,835 to Lee (1976), (j) 4,036,516 to Oldham (1977), (k) 4,114,932 to Freeberg (1978), (l) 4,316,625 to Goon (1982), (m) 4,486,039 to Jayne (1984), (n) 4,575,135 to Cervinka (1986), (o) 4,809,883 to Pozo (1989), (p) 4,968,069 to Jensen (1990), (q) 5,118,142 to Bish(1992), (r) Des.364,173 to Woods (1995), (s) 5,580,106 to Dulberg (1996), (t) 6,371,532 B1 to Skarie (2002), and (u) 6,488,217 to Donastorg (2002).

Although each of the above patents have different configurations they must have a nozzle to distribute material in front of the tires in order to aid traction. None of these patents have a single means of keeping ice and snow from forming on the nozzle. If one or both nozzles have obstructions it will create a safety hazard. The vehicle could slip sideways and out of control or roll over. The driver must be able to rely on the dispensing unit to operate properly.

All of the above patents could be criticized individually but those are their creations and I am very uncomfortable doing so. The only reason I do is that several fellow members of the Oklahoma Inventors Congress stated that it is important. My invention can stand on its own merit.

The following will demonstrate how we solved the ice buildup problem with the added improvements of a heat element and an ice pick.

OBJECTS AND ADVANTAGES

Accordingly, besides the objects and advantages of the dispensing devices described above, my invention is far superior to any of them. My objects and advantages are:

(a) The different configurations of sand boxes that can be adapted to many types of vehicles. These can be placed over the wheel well, in front of the wheel well or tied to a tool box across the front of the pickup bed.

(b) This design can be installed on pickups, passenger cars, passenger vans, all cargo vans and semi-trucks both tractor and trailer.

(c) The sand is dispensed to the rear tires only so that it will offer a drag effect. If sand is dispensed to the front tires first and not the back it can cause a vehicle to jack-knife and/or go out of control.

(d) Sand flow tests show that a vehicle can lay down a stream of sand to enhance traction on ice for a minimum of one hour. With the increased size of the sand box this can be extended.

(e) Vehilcles traveling in convoy can alternate the lead position and all trailing vehicles can use the same sand laid down by the lead vehicle.

(f) A screened gate valve controls the sand flow.

(g) This design has a nozzle for dispensing sand with an ice pick, an outer flexible rubber covering and an electrical heat element. All of these refinements are designed to help alleviate ice buildup.

(h) The installation is such that a layman can install this device with written instructions.

Further objects and advantages will become apparent upon reviewing ensuing description and drawings.

SUMMARY

In accordance with the present invention a traction control device consists of three elements. A box for holding sand, a control mechanism and a nozzle for dispensing sand. The nozzle also contains an ice pick and a heater element.

DRAWINGS—FIGURES

FIG. 6 thru 11 are side views of configurations of the three main elements to be adapted to pickups, cargo vans, semi-tractors/trailers and automobiles.

DETAILED DESCRIPTION—FIG. 1–3
PREFERRED EMBODIMENT

Figure 1:
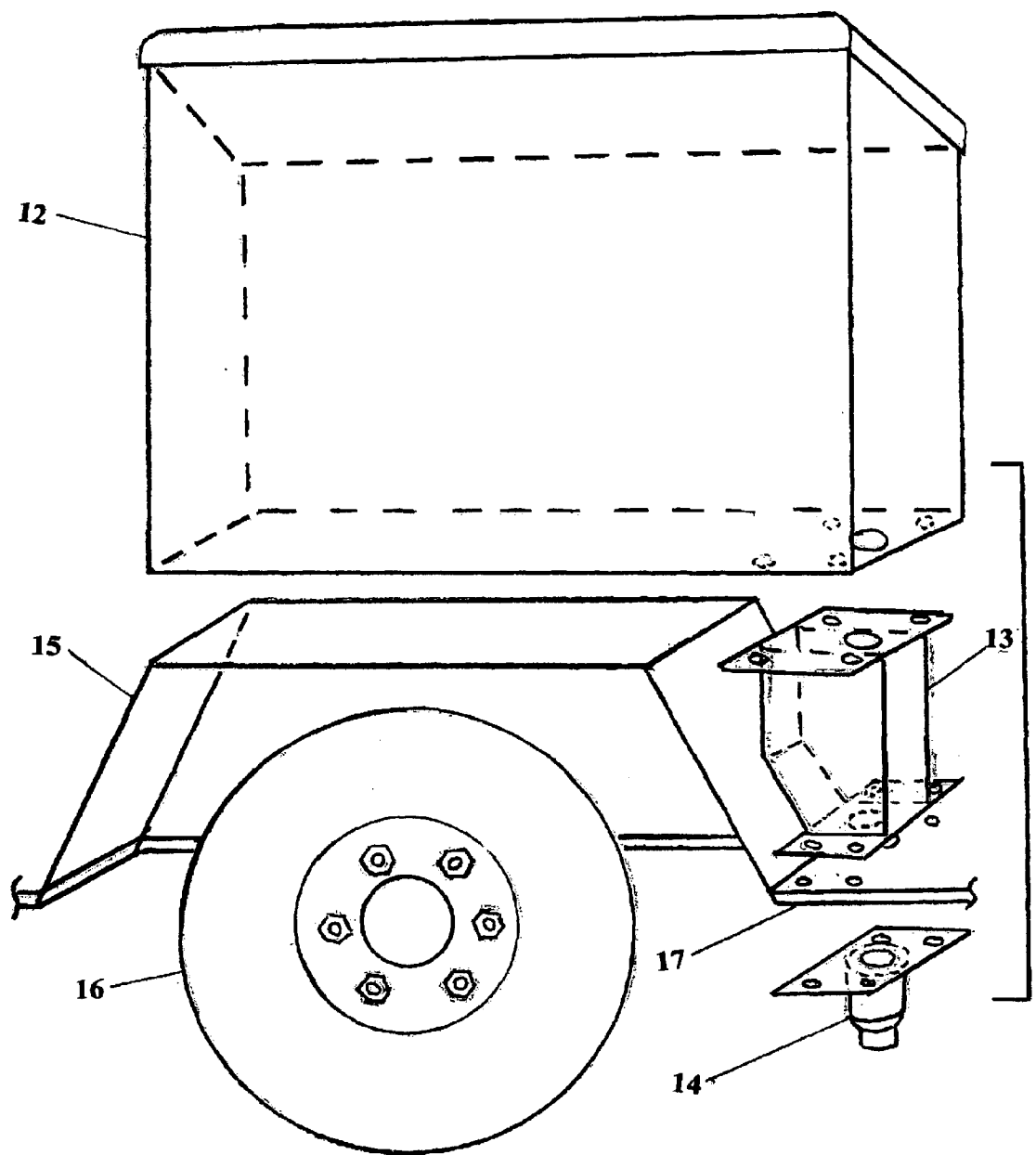
FIG. 1 is a perspective view of the three main elements of the invention.

A preferred embodiment of the operation of the present invention is illustrated in FIG. 1. The Traction Control Device has a sand box 12 manufactured of sheet metal, fiberglass or other suitable material. This sand box can be used on pick-ups and cargo vans. It has a watertight lid. The sand box also has holes in the bottom for dispensing sand and for mounting the mechanism control box 13. The mechanism control box is then attached either through the vehicle bed 17 or the wheel well 15 to the sand dispensing nozzle 14. The rear tire 16 is shown merely for clarification.

Figure 2:
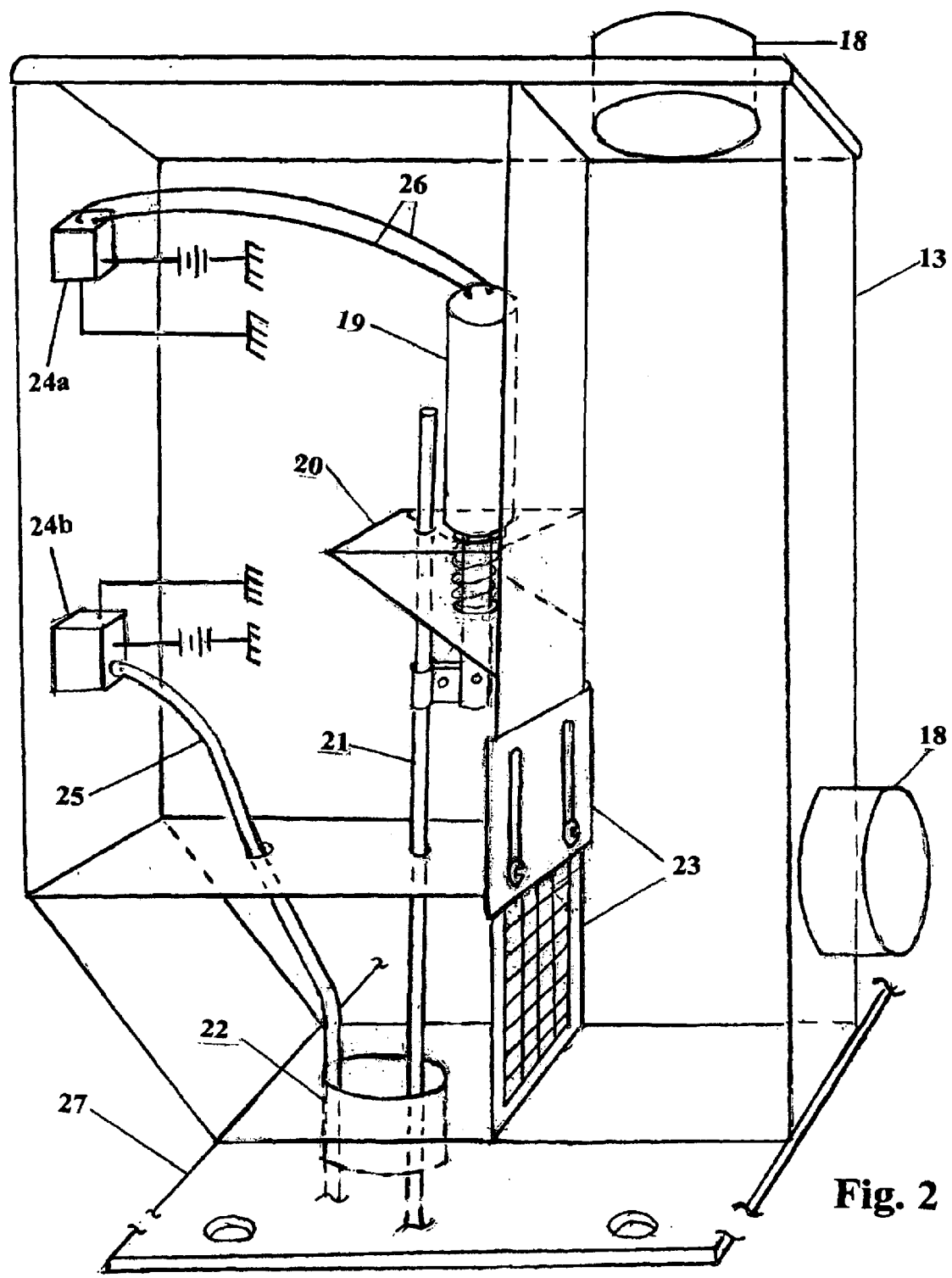
FIG. 2 is a perspective view of the control mechanism

FIG. 2, the mechanism control box, has two sand inlets 18 leading from the sand box. The one not used will be caped off. The sand continues to flow through the gate valve with filtering screen 23. The gate valve is designed to control the amount of sand flowing through the device. The sand outlet 22 leads to the sand dispensing nozzle for further distribution to the front of the rear tire. The pull type solenoid 19 is the main element of the control box. The solenoid is mounted on the solenoid mounting bracket 20 and has a solenoid operating rod 21 leading to the butterfly valve 28 located in FIG. 3. There are two relays in the mechanism control box. The solenoid relay 24a where the solenoid leads 26 are attached. The heat tape relay 24b operates the heat tape 31 which is a part of the sand dispensing nozzle. The heat tape leads 25 are attached to that relay. See FIG. 4 and 5 for electrical schematics on the solenoid and heat tape. The heat tape is an integral part of the sand dispensing nozzle. The control box mounting plate 27 is mounted directly, or indirectly with a dispensing hose 40 to the sand dispensing nozzle.

Figure 3:
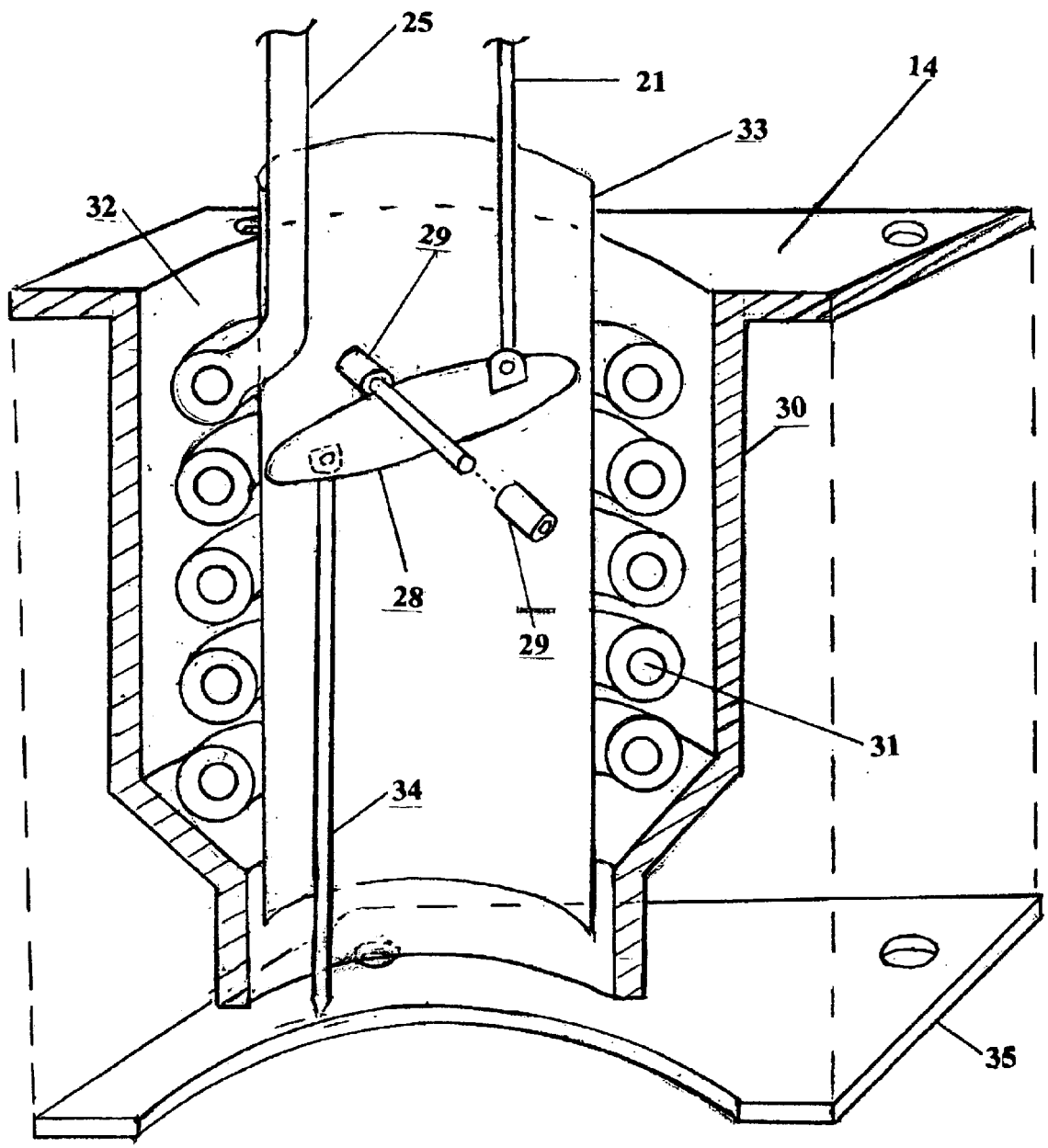
FIG. 3 is a perspective view of the nozzle with buttefly valve, ice pick and heater element

In FIG. 3 is the down spout 33 which matches the size of the sand outlet and is the inner component of the sand dispensing nozzle. The outer component is the nozzle outer housing/rubber sleeve 30.

Between the two components a cavity is created in which is installed a coil of heat tape and the butterfly valve bearings 29. The heat tape leads extend to the heat relay in the mechanism control box. Fiberglass resin 32 is poured between the down spout and the nozzle outer housing/rubber sleeve to secure the heat tape and butterfly valve bearings. The ice pick 34 is attached to the bottom of the butterfly valve.

The nozzle mounting plate 35 is used to secure the nozzle outer housing/rubber sleeve to the mechanism control box via the wheel well or vehicle bed.

Figure 4:
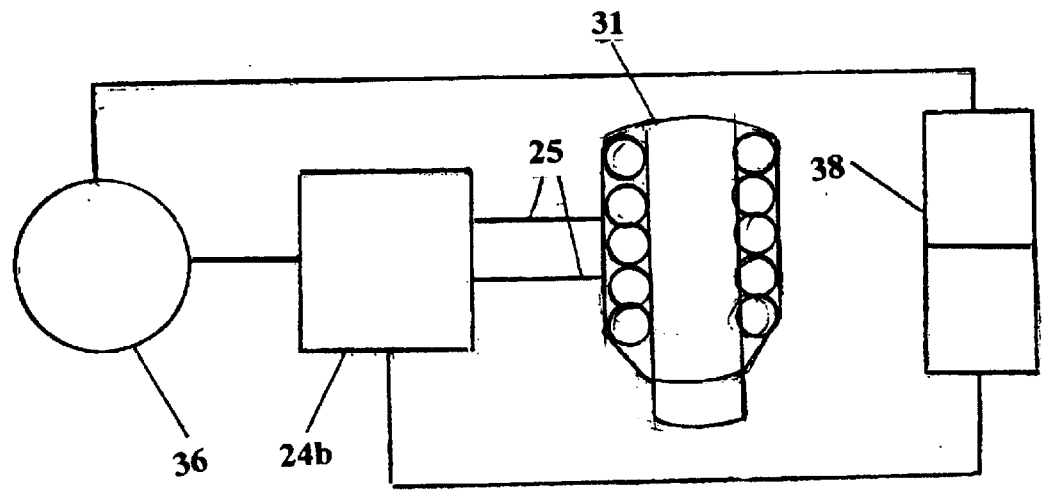
FIG. 4 is an electrical schematic diagram of the heat mechanism.

FIG. 4 is the electrical schematic for operation of the heat tape. The tail light (existing) 36 is the source of power for the heat tape. The heat tape leads go through the relay to the tail light then to the on/off switch 38 installed on the dashboard of the vehicle then back to the relay.

Figure 5:
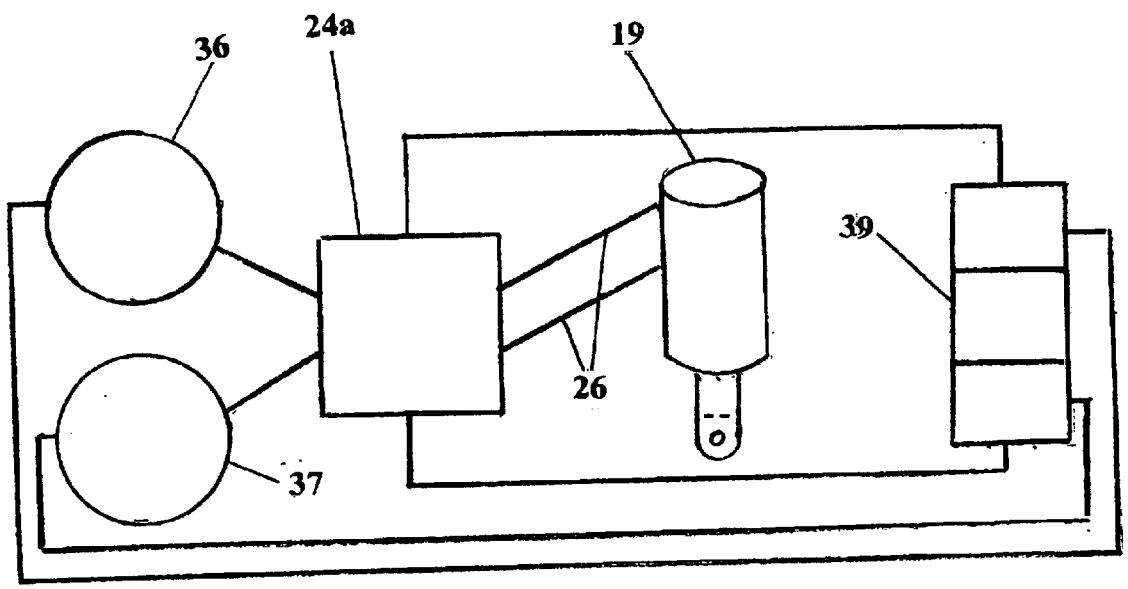
FIG. 5 is an electrical schematic diagram of the solenoid for both continuous and intermittent operation.
Figure 6:
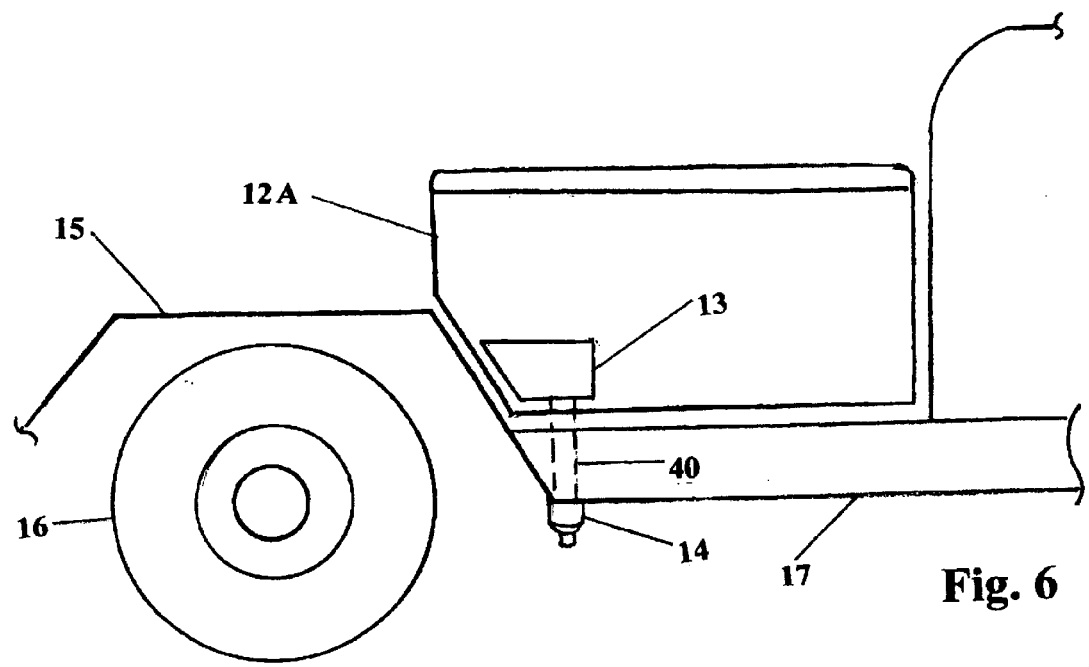

FIG. 5 is a dual operation for the solenoid. Positive side one of the on/off/on switch 39 is hooked to the tail light for continuous operation. In this instance the solenoid leads are hooked to the relay then to the tail light, to the switch and back to the relay. Both the tail light switch and the solenoid switch must be on for this to operate.

Positive side two of the on/off/on switch is hooked to the stop light (existing) 37 for intermittent operation. The tail light switch need not be on for this to operate, only the solenoid switch. The solenoid leads go to the relay, on to the stop light, to positive side two of the on/off/on switch and back to the relay.

FIGS. 1, 6–11—Additional Embodiments

Figure 7:
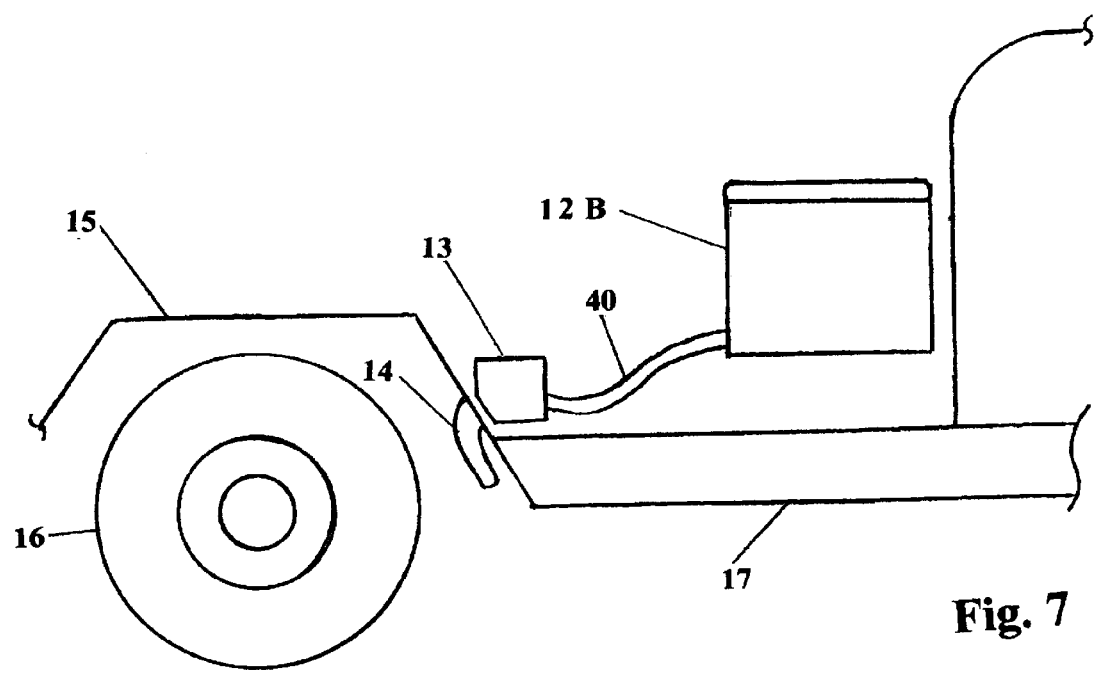
Figure 8:
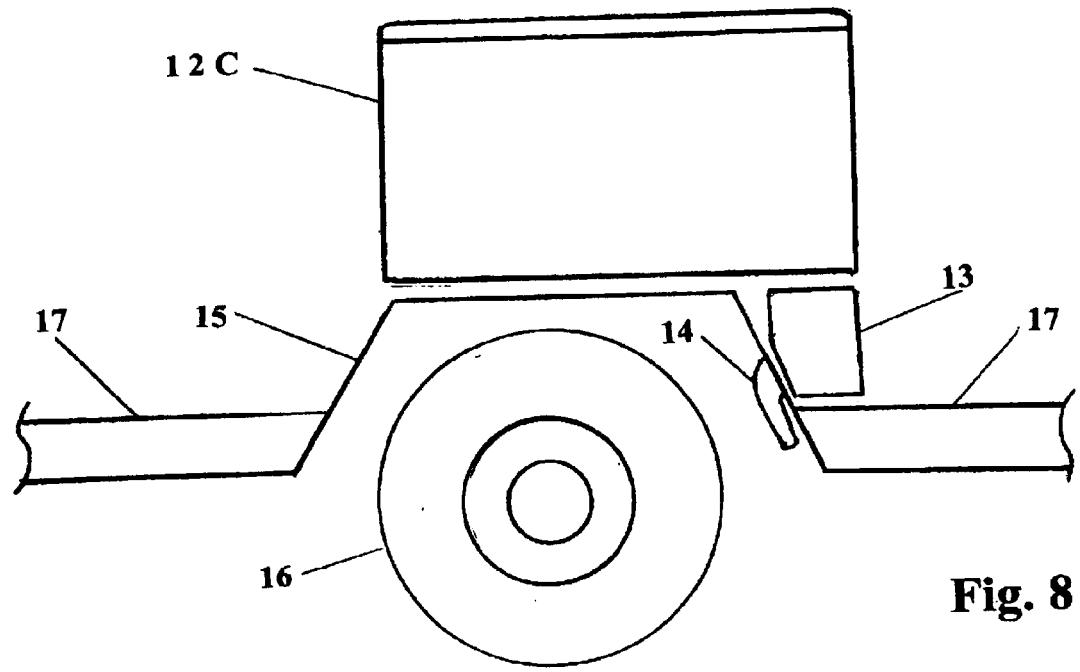
Figure 9:
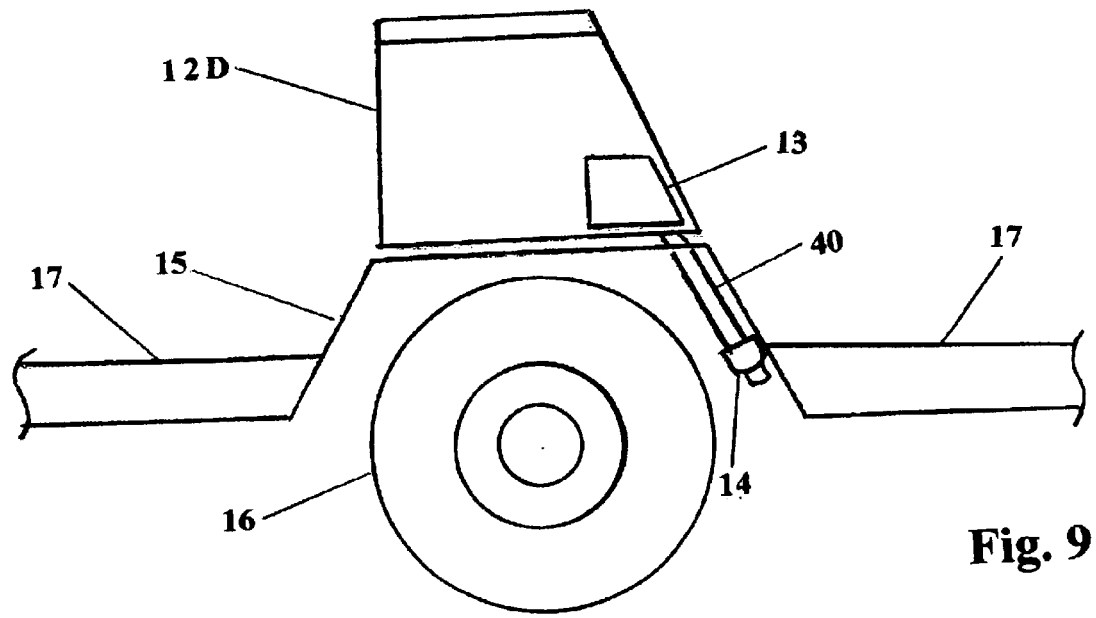
Figure 10:
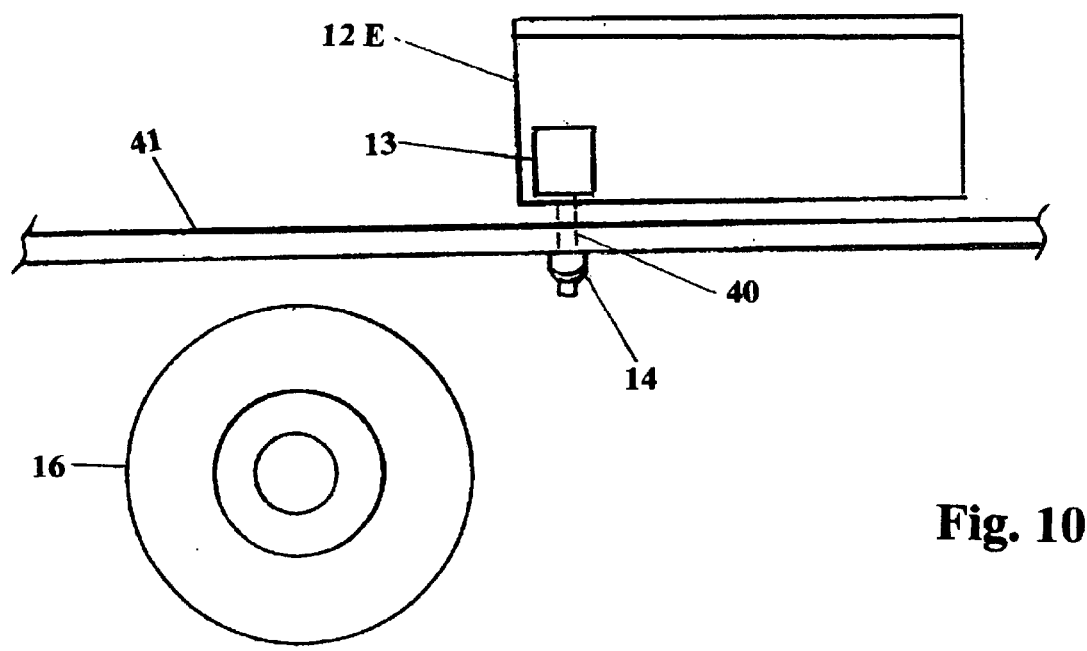
Figure 11:
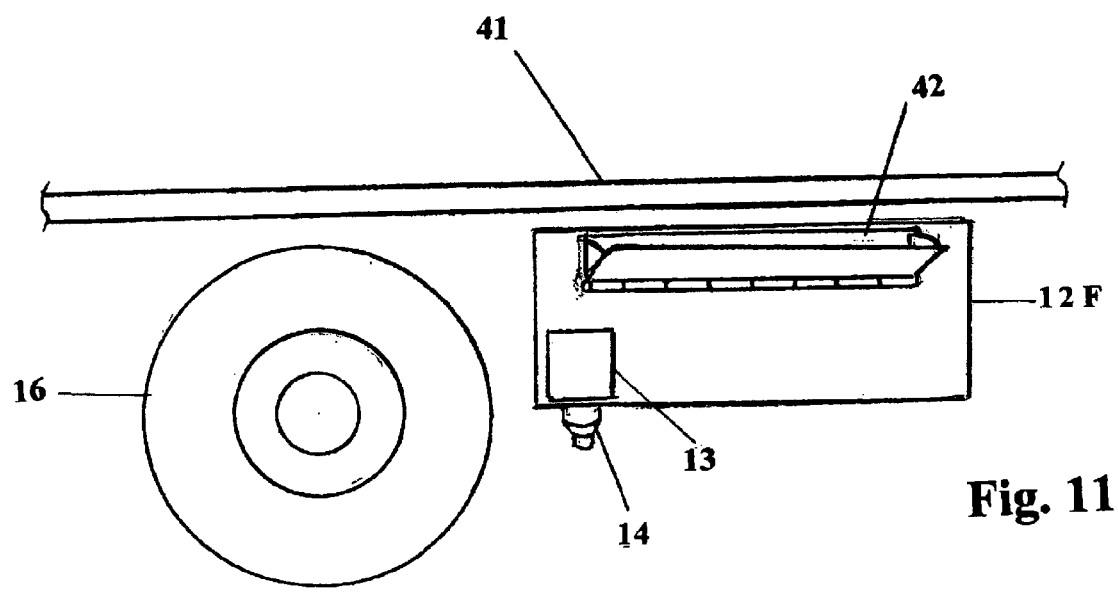

Additional embodiments are shown in FIGS. 1, 6, 7, 8, 9, 10 and 11; In each case the Figures show the same three main components that make up the system. However in each of the above Figures the sand boxes numbers 12, 12A–12F are of different configurations in order to adapt to various types of vehicles. This includes virtually all land vehicles that travel our highways. There are some differences such as FIGS. 6, 9, 10 and 11 show the mechanism control box installed inside the sand box. FIGS. 6, 7, 9 and 10 have a dispensing hose connecting the mechanism control box with the sand dispensing nozzle. In FIGS. 7, 8 and 9 the union of the mechanism control box and the dispensing nozzle is through the wheel well rather than through the floor of the vehicle. FIG. 11 has a sand box filler chute/door 42 which opens to the side. This will be adapted to such vehicles as semi-trailers/trucks and cargo vans in order to save cargo space and for added protection of the traction control device.

OPERATION

The manner of operation of the traction control device is similar to those patents already awarded. Namely, the flow of sand is from a sand box 12, through a mechanism control box 13, to be dispensed onto the roadway thus enhancing the traction of the tires of a vehicle. This is by gravity feed as is demonstrated in FIG. 1 of this application.

A "nozzle" can be nothing more than a tube installed in the vicinity of the tires. However, in FIG. 3 my invention shows the sand dispensing nozzle 14, containg a butterfly valve 28, activated by a solenoid control rod 21, which also activates the ice pick 34. When the pull type solenoid 19 in FIG. 2 is activated it opens the butterfly valve allowing the sand to flow through the sand dispensing nozzle to the front of the rear tires. This action also drives the ice pick down displacing the ice that has built up on the sand dispensing nozzle.

As indicated in FIG. 5, the operation of the butterfly valve is two fold. One, which I will call continuous, permits the butterfly valve to remain open continuously thus laying down a stream of sand in front of the rear tires of the vehicle. The power source for the continuous operation is from the tail light 36. This activity starts at the on/off/on switch 39, to the tail light, to the solenoid relay 24a, to the solenoid and back to the on/off/on switch. The tail lights must be on for this to operate.

The other, which I will call intermittent, permits a larger amount of sand, which has built up below the gate valve with filtering screen 23, to be dispensed. The power source for the intermittent operation is activated by the stop light and is used in emergency breaking situations. This activity starts at the on/off/on switch, to the stop light 37, to the solenoid relay, to the solenoid and back to the on/off/on switch. The tail lights need not be on for this to operate.

As indicated in FIG. 4, the object of the heat tape 31, is to provide heat to the sand dispensing nozzle 14. This is seperate from the solenoid operation in that heat should be applied contionuously to the dispensing nozzle in all adverse weather conditions. The power source for the heat tape operation is the tail light. This activity starts at the on/off switch 38, to the tail light, to the heat tape relay 24b, to the heat tape and back to the on/off switch. The tail lights must be on for this to operate. To get the best results the switches should be activated from a convenient location near the driver of the vehicle, preferably on the dash board of the vehicle.

An added feature of this device can be a light that appears in the cab of the vehicle to indicate when the sand box is empty. This is not shown because of the simplicity of that feature.

From the description above, a number of advantages of my land vehicle traction control device becomes evident:

(a) The low cost of manufacturing the device thereby transferring the savings on to the consumer.

The materials for construction are readily available to the manufacturer thus culminating in low cost, economical and simple product.

(b) The simplicity of installing the divice. It can be installed by a layman with minimum mechanical skills by following instructions provided with each unit.

(c) Initially the ice pick will crack any ice on the dispensing edge of the sand dispensing nozzle.

(d) The heat tape melts any ice accumulating and prevents ice from forming on the sand dispensing nozzle.

(e) The heat from the heat tape also radiates into the mechanism control box thus keeping the sand warm and ready to be dispensed.

(f) The amount of sand flow can be controlled by the gate valve.

(g) The screen on the gate valve will filter out any large objects that may be accidentally put in the sand box. This will keep the dispensing nozzle from clogging and becoming inoperable.

(h) The device, installed on emergency vehicles such as fire trucks, ambulances and police vehicles will facilitate those vehicles getting to their destination thus saving lives, property and more chaos.

(i) The device, installed on delivery vehicles such as post office, delivery truck and semi-trailer vehicles, will facilitate those vehicles getting to their destination. This will save time and money.

(j) The device will facilitate the vehicle from getting out of a stalled situation by turning on the device and "rocking" the vehicle onto the sand.

(k) The lead vehicle can Jay down a layer of sand not only for their own vehicle but for those vehicles trailing. Lead position can be alternated for those vehicles traveling in convoy.

(l) The buttefly valve and solenoid operating rod, when activated, will disturb the sand and will prevent clogging allowing a free flow of sand.

(m) This device can not only use sand but can be adapted to larger grain material.

(n) This device can be used as an option by vehicle manufacturers as well an aftermarket item.

(o) This device will save time in reaching destinations, destruction of vehicles and property, injury to vehicle occupant, cut down on need for hospitilization and will save countless lives.

The foregoing description is included to illustrate the operation of the preferred embodiment and is not meant no limit the scope of the invention. The scope of the invention is to be limited only by the following claims and their legal equivalents, rather than by the examples given.

What is claimed is:

1. A land vehicle traction control device, for enhancing the traction of a land vehicle in adverse ice and snow conditions, comprising:

a sand box for holding sand;

a nozzle for discharging sand from the sand box;

an arrangement, for controlling the flow of sand, including a butterfly valve located in the nozzle and connected to a solenoid by a solenoid operating rod for operating the butterfly valve between open and closed positions, a heating element positioned at the nozzle for melting ice buildup, and ice pick in the form of a rod with a sharp end in the nozzle for breaking ice buildup; and wherein, said butterfly valve is in the form of a plate that pivots about an axis that divides the plate into two halves; and said operating rod has an end pivotally mounted on one halve of the plate, and said ice pick rod has an end pivotally mounted to the other halve of the plate such that when the operating rod pivots the plate into the open position, the plate forces the ice pick rod downwardly to break any ice buildup at the nozzle.

\* \* \* \* \*